United States Patent
Cho et al.

(10) Patent No.: US 11,069,489 B2
(45) Date of Patent: Jul. 20, 2021

(54) MULTIFUNCTIONAL SWITCH MANIPULATOR

(71) Applicants: Hyundai Motor Company, Seoul (KR); Kia Motors Corporation, Seoul (KR)

(72) Inventors: Jae Hyeong Cho, Gyeonggi-do (KR); Yeon Ji Kang, Gyeonggi-do (KR); Pill Yoon Kim, Gyeonggi-do (KR); Jae Min Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/849,650

(22) Filed: Apr. 15, 2020

(65) Prior Publication Data

US 2020/0328033 A1 Oct. 15, 2020

Related U.S. Application Data

(60) Provisional application No. 62/834,358, filed on Apr. 15, 2019.

(30) Foreign Application Priority Data

Apr. 1, 2020 (KR) .................... 10-2020-0039742

(51) Int. Cl.
*H01H 3/08* (2006.01)
*H01H 3/16* (2006.01)
*H01H 3/46* (2006.01)

(52) U.S. Cl.
CPC .............. *H01H 3/08* (2013.01); *H01H 3/163* (2013.01); *H01H 3/46* (2013.01)

(58) Field of Classification Search
CPC ........... H01H 3/08; H01H 3/163; H01H 19/02
USPC ........................................ 200/336; D13/174
See application file for complete search history.

(56) References Cited

U.S. PATENT DOCUMENTS

| | | | |
|---|---|---|---|
| 5,736,696 A * | 4/1998 | Del Rosso | B60Q 1/1461 200/5 R |
| 8,364,342 B2 * | 1/2013 | Springer | G06F 3/016 701/36 |
| 2014/0238831 A1 * | 8/2014 | Kagaya | H01H 25/065 200/336 |

* cited by examiner

*Primary Examiner* — Edwin A. Leon
*Assistant Examiner* — Iman Malakooti
(74) *Attorney, Agent, or Firm* — Mintz Levin Cohn Ferris Glovsky and Popeo, P.C.; Peter F. Corless

(57) ABSTRACT

A multifunctional switch manipulator is provided. The manipulator includes a first switch unit, which is curved to be convex at the upper surface thereof, a second switch unit, which is disposed at a first side of the first switch unit and which extends radially in a first direction, and a third switch unit, which is disposed at a second side of the first switch unit and which extends radially in a second direction opposite the first direction. Each of the second and third switch units includes a housing that has an opening and a rotary knob disposed at the housing to be rotatable in a direction in which the opening extends, and at least one surface of the rotary knob is exposed to an outside through the opening.

17 Claims, 7 Drawing Sheets

MULTIFUNCTIONAL SWITCH MANIPULATOR

CROSS-REFERENCE TO RELATED APPLICATION(S)

This application claims the benefit of Korean Patent Application No. 10-2020-0039742, filed on Apr. 1, 2020, which is hereby incorporated by reference as if fully set forth herein. This application also claims the benefit of U.S. Provisional Application No. 62/834,358, filed on Apr. 15, 2019, the contents of which are hereby incorporated by reference in their entirety.

BACKGROUND

Field of the Invention

The present invention relates to a multifunctional switch manipulator, and more particularly, to a multifunctional switch manipulator in which an interior door handle and a power window switch are integrated into a single assembly.

Discussion of the Related Art

With developments in electronic control technology, various components within a vehicle that have conventionally been operated mechanically are now operated by electronically for the purpose of driver convenience, driving safety and the like, and vehicle systems are becoming progressively more sophisticated and advanced. Generally, a door trim forming a door of a vehicle includes an interior door handle mounted thereon, and many armrests include power window switches capable of raising and lowering window glass through simple manipulation rather than manual devices for convenience.

However, since the interior door handle and the power window switch are operated in the state of being separated from each other, it is impossible to meet the trend toward reduced size for the purpose of securing additional interior space in a vehicle and ensuring design freedom, and furthermore, standardization thereof is restricted.

SUMMARY

Accordingly, the present invention is directed to a multifunctional switch manipulator that substantially obviates one or more problems due to limitations and disadvantages of the related art. An object of the present invention is to provide a multifunctional switch manipulator, in which an interior door handle and a power window switch are integrated into a single assembly and which is configured to be gripped by a user more easily, thereby decreasing the size of the manipulator and increasing design freedom.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multifunctional switch manipulator may include a first switch unit, which is curved to be convex at the upper surface thereof, a second switch unit, disposed at a first side of the first switch unit and extending radially in a first direction, and a third switch unit, disposed at a second side of the first switch unit and extending radially in a second direction, opposite the first direction. Each of the second and third switch units may include a housing having an opening and a rotary knob disposed at the housing to be rotatable in a direction in which the opening extends, and at least one surface of the rotary knob is exposed to an outside through the opening.

An upper surface of the first switch unit and the housings of the second and third switch units may have the same radius of curvature. The first to third switch units may be arranged along a first axis to be parallel to one another. The multifunctional switch manipulator may be configured such that the second and third switch units are coupled to each other to face each other, with the first switch unit interposed therebetween, and the multifunctional switch manipulator may have a semispherical shape, the two ends of which may be cut into dome shapes. The opening may have a track shape.

Each of the second and third switch units may include a gripper disposed on at least one surface of the rotary knob. The rotary knob may include a first rotary knob and a second rotary knob, which are received in the housing, and the first and second rotary knobs may be coupled to each other to be rotatable about a second axis parallel to the first axis. The first and second rotary knobs may be spaced apart from each other in a direction of the first axis.

The gripper may include a first gripper disposed on one surface of the first rotary knob and projects toward the second rotary knob, and a second gripper disposed on one surface of the second rotary knob and projects toward the first rotary knob. Lengths of the first and second grippers may be the same. The first and second grippers may be spaced apart from each other in a direction in which the opening extends.

The rotary knob may be rotatable only within a predetermined rotational range by a stopper provided inside the housing. The first switch unit may include a bracket and a handle knob, which is coupled at one end thereof to the bracket via a third axis to be rotatable about the third axis. The third axis may be parallel to the first axis, and may be different from the second axis. When the handle knob is rotated in one direction, a rod connected to the handle knob may be pulled to release a locked state of a door latch, thereby allowing a door of the vehicle to be opened.

When the rotary knob is rotated in one direction, a window glass of the vehicle may be raised or lowered by a height that corresponds to a rotational displacement of the rotary knob. Additionally, the first to third switch units may be partially received and disposed in a reception groove in a panel part. The rotary knob may be provided on at least one surface thereof with a corrugated pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION OF THE INVENTION

Figure 1:
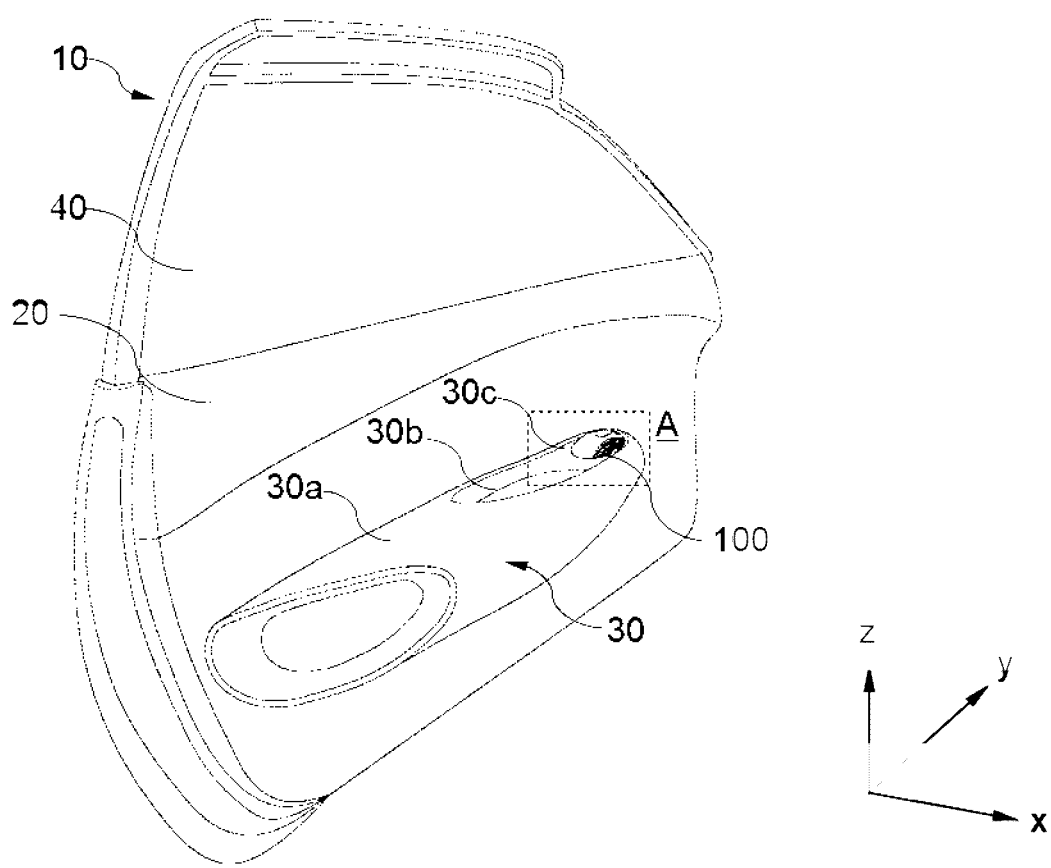
FIG. 1 is a schematic view showing the construction of a door to which a multifunctional switch manipulator according to an exemplary embodiment of the present invention is applied.

Reference will now be made in detail to various embodiments of the present invention, specific examples of which are illustrated in the accompanying drawings and described below, since the exemplary embodiments of the present invention may be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. The terms, which are particularly defined in consideration of construction and operation of embodiments, are only for purpose of description of the embodiments, and are not intended to limit the scope of the invention.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only, and is not intended to be limiting. As used herein, the singular forms "a," "an" and "the" are intended to include the plural forms as well, unless the context clearly indicates otherwise. It will be further understood that the terms "comprise", "have", etc. when used in this specification specify the presence of stated features, integers, steps, operations, elements, components, or combinations thereof, but do not preclude the presence or addition of one or more other features, integers, steps, operations, elements, components, or combinations thereof.

Unless otherwise defined, all terms including technical and scientific terms used herein have the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

In the Cartesian coordinate system described in the specification, a longitudinal direction of a vehicle body is defined as an x-axis direction, a transverse direction of the vehicle, which is perpendicular to the x-axis direction, is defined as a y-axis direction, and a direction perpendicular to the x-y plane is defined as a z-axis direction. The drawings will be described based on the definition.

Hereinafter, multifunctional switch manipulators according to various embodiments of the present invention will be described with reference to the accompanying drawings.

FIG. 1 a schematic view showing the construction of a door to which a multifunctional switch manipulator according to an exemplary embodiment of the present invention is applied. Referring to FIG. 1, the door 10 coupled to the vehicle body via a hinge and is opened and closed to allow a passenger to get into and out of the vehicle, may include a door outer panel, a door inner panel and a door trim, which are assembled with one another to define the appearance of the vehicle.

The door trim 20 may be provided at a predetermined height with an armrest 30 on which a passenger's arm is rested. The armrest 30 may be coupled to the outer surface of the door trim 20 to project toward the interior of the vehicle, and a portion thereof may be bent to protect the passenger from an exterior impact.

The armrest 30 may include a fixing part 30a, a pocket part 30b and a panel part 30c, disposed in that order in the x-axis direction. The fixing part 30a may directly secure the armrest 30 to the door trim 20 and may be designed to have strength sufficient to endure the load that is applied to the armrest when a passenger's arm is rested thereon. The pocket part 30b may include a door pocket, which is open at the upper surface thereof to receive articles therein, and the panel part 30c may include the multifunctional switch manipulator 100 configured to manipulate the door 10 and/or a window glass 40.

In a conventional vehicle, an interior door handle is mounted on the door trim 20, and a power window switch is mounted on the armrest 30 such that the two components are manipulated separately. However, this does not follow the trend toward reduced size for securing increased space in the vehicle and freedom in design, and inconvenience increases for a worker to mount the armrest on the door 10.

Accordingly, the present invention provides a multifunctional switch manipulator 100 in which an interior door handle and a power window switch are integrated into a single standardized assembly to downsize the armrest 30 and to ensure ease of a replacement operation.

Figure 2:
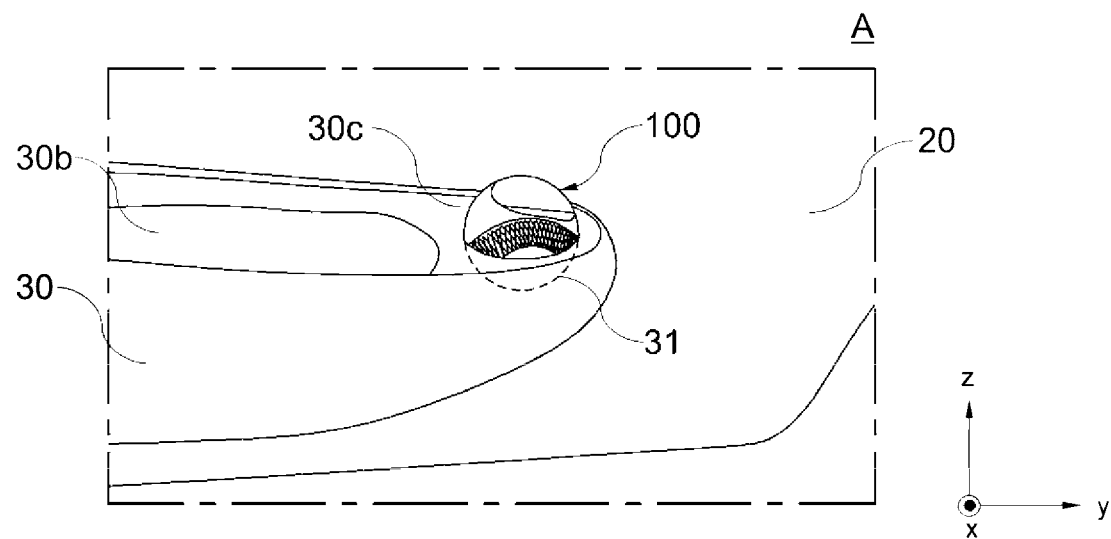
FIG. 2 is a side enlarged view of area A in FIG. 1 according to an exemplary embodiment of the present invention is applied.

FIG. 2 is a side enlarged view of area A in FIG. 1. Referring to FIG. 2, the panel part 30c, which forms the armrest 30, is provided with a reception groove 31 having a predetermined accommodation space in which a portion of the multifunctional switch manipulator 100 is received. The reception groove 31 may be formed to have a groove shape depressed from the upper surface to a predetermined depth. The reception groove 31 may have a shape that corresponds to the shape of the multifunctional switch manipulator 100 facing the reception groove 31.

The multifunctional switch manipulator 100 may be received at a portion thereof in the reception groove 31 in the armrest 30 and may be exposed at the remaining portion thereof to the outside to allow a user to manipulate the multifunctional switch manipulator 100. The multifunctional switch manipulator 100 may be configured to have a shape and size as to be capable of being gripped in a user's hand.

Figure 3:
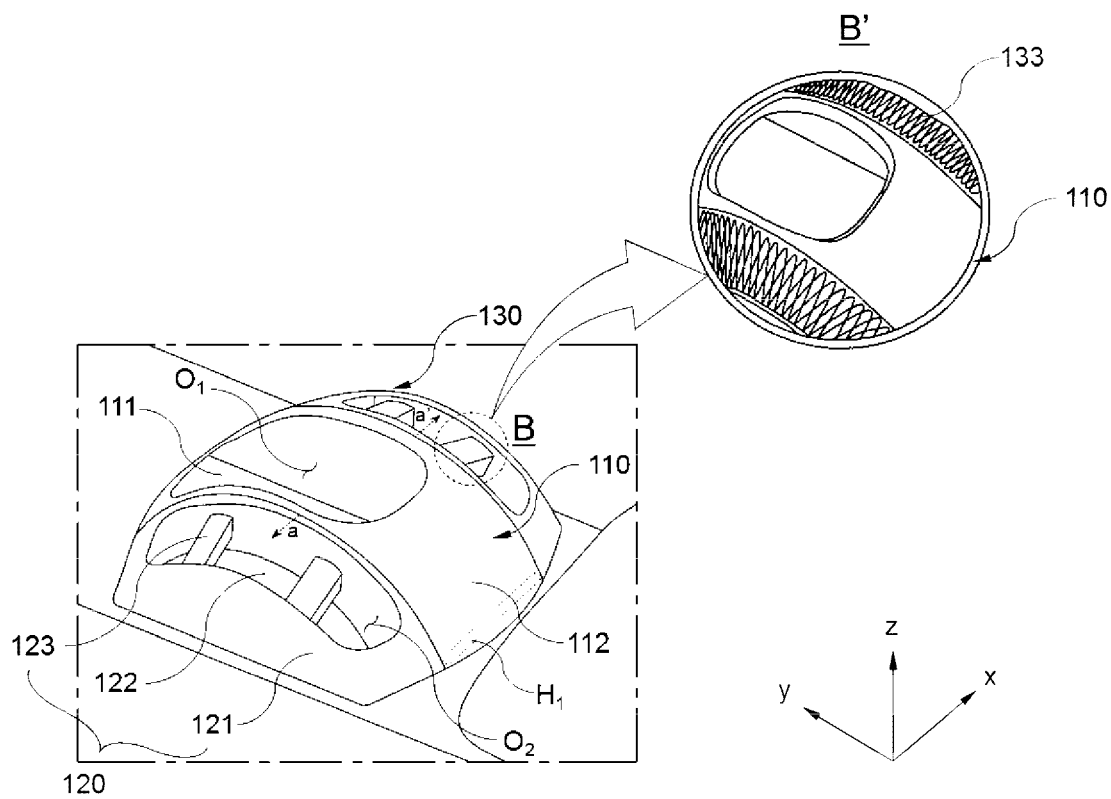
FIG. 3 is an enlarged perspective view of the multifunctional switch manipulator provided at the armrest of a driver's seat according to an exemplary embodiment of the present invention.

For convenience, the multifunctional switch manipulator 100 may be divided and disposed at a predetermined region thereof based on the function thereof. A description thereof will be given with reference to FIG. 3. FIG. 3 is an enlarged perspective view of the multifunctional switch manipulator provided at the armrest 30 of the driver's seat according to an exemplary embodiment of the present invention.

Referring to FIG. 3, the multifunctional switch manipulator 100 may include a first switch unit 110, which is curved to be convex at the upper surface thereof, a second switch unit 120, disposed at a first side of the first switch unit 110 and extending radially in a first direction (a), and a third switch unit 130 disposed at a second side of the first switch unit 110 and extending radially in a second direction (a') opposite the first direction (a).

The first to third switch units 110, 120 and 130 may be disposed along the central axis X (see FIG. 5) of the multifunctional switch manipulator 100 to be parallel to one another. In particular, since the multifunctional switch manipulator 100 is configured such that the second and third switch units 120 and 130 are coupled to each other to face each other with the first switch unit 110 interposed therebetween, the multifunctional switch manipulator 100 may have a semispherical shape, the two ends of which are cut into dome shapes. However, the overall shape of the multifunctional switch manipulator 100 is not limited to any specific shape.

In the multifunctional switch manipulator 100, the first switch unit 110 may operate to open the door 10 of the vehicle, and the second and third switch units 120 and 130 may operate to raise and lower the window glasses 40 of the vehicle. However, the exemplary embodiment is merely for illustrative purposes, and the scope of the present invention is not limited thereto.

Figure 6:
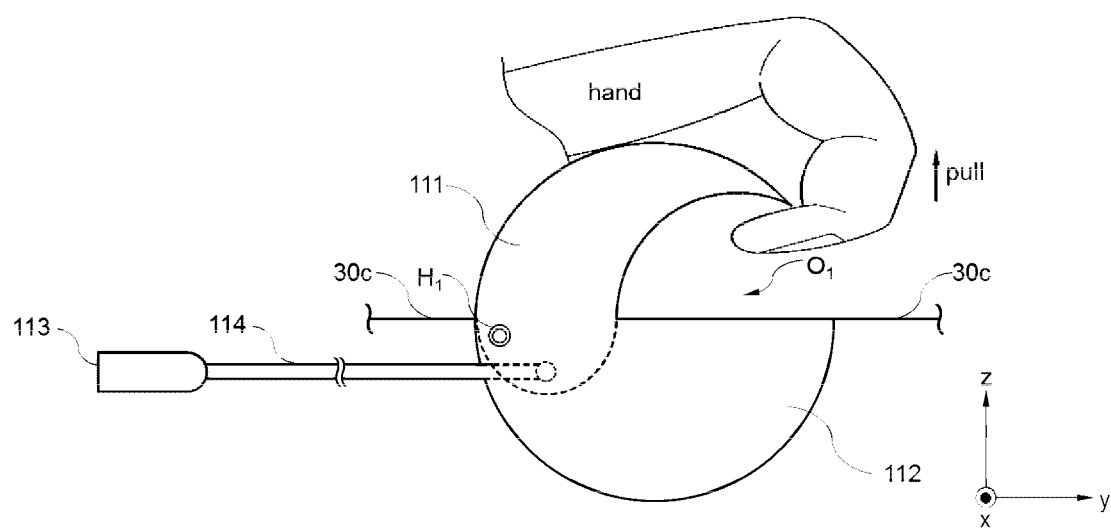
FIG. 6 is a cross-sectional view showing the internal structure of a first switch unit according to an exemplary embodiment of the present invention.

The first switch unit 110 may include a rod 114 and the rod may include a handle knob 112 rotatably connected at one end thereof to a bracket 111 via a hinge pin $H_1$ and which is integrally connected at one end thereof to the handle knob 112 to release the door latch 113, and a return spring (not shown), which is compressed upon manipulation of the handle knob 112 and which provides elastic force to return the handle knob 112 to the initial position upon releasing the manipulation of the handle knob 112 (see FIG. 6).

An opening $O_1$ having a predetermined size may be provided between the bracket 111 and the handle knob 112 to receive a user's finger therein. The upper surface of the handle knob 112 may be curved to be convex outwards. A user may open the door 10 by directly rotating the handle knob 112.

Figure 7:
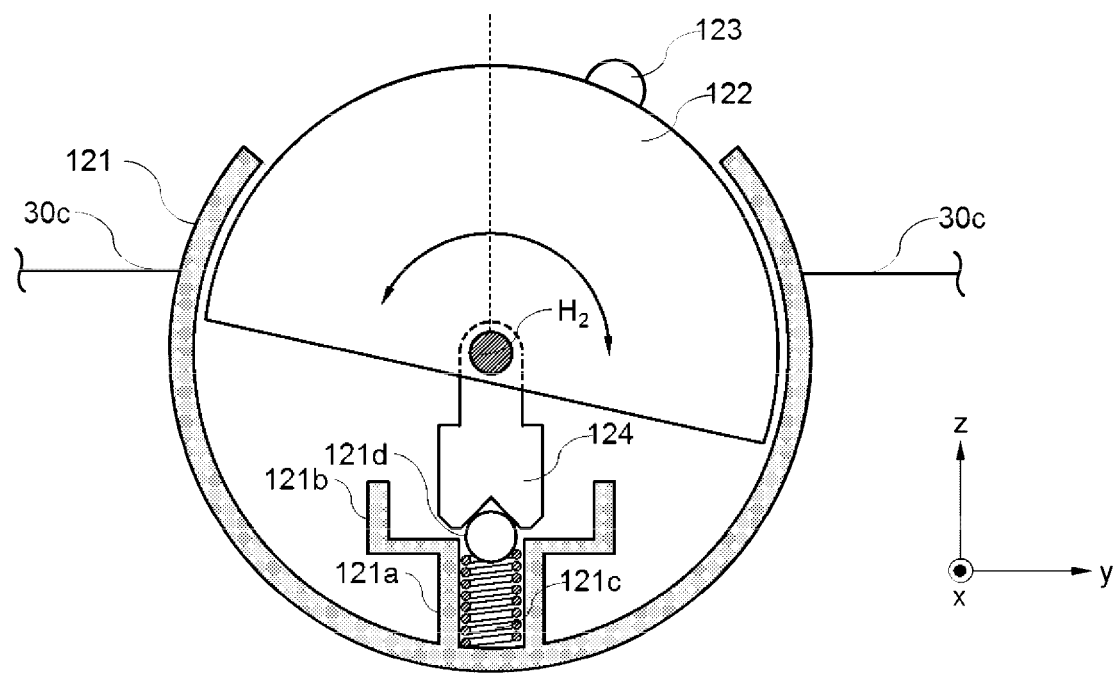
FIG. 7 is a cross-sectional view of a second switch unit according to an exemplary embodiment of the present invention in the neutral state.

When a user rotates the handle knob 112, for example, in a counterclockwise direction, the rod 114, which is connected to the handle knob 112, may be pulled to release the locked state of the door latch 113, thereby allowing the door 10 to be opened (see FIG. 7). When the door 10 is opened by a user while the return spring (not shown) stores elastic energy in the compressed state, the handle knob 112 may be rotated to the initial position thereof in a clockwise direction by the elastic force of the return spring (not shown).

Each of the second and third switch units 120 and 130 may include a housing 121 or 131, a rotary knob 122 or 132, grippers 123 or 133, and a contact circuit (not shown). The elements of the second and third switch units 120 and 130 are substantially the same as each other with regard to the function, structure and shape thereof. Accordingly, the second and third switch units will be described based on the second switch unit 120 to avoid the redundant description.

The second switch units 120 may include the housing 121 that defines the appearance of the second switch unit 120, the rotary knob 122 disposed in the housing 121 to be rotatable in the direction (in the y-axis direction) in which the opening $O_2$ in the housing 121 extends, and the contact circuit (not shown) configured to generate an electric signal in response to the rotational movement of the rotary knob 122 and to raise and lower the window glass 40 in response to the electric signal.

The housing 121 may include a first end disposed adjacent to the first switch unit 110 and having a first diameter, a second end disposed opposite the first end and having a second diameter that is less than the first diameter, and a circumferential surface that surrounds the first and second ends and may have a tapered shape the cross-sectional area of which progressively decreases toward the outside. The housing 121 may have a cavity therein that accommodates the rotary knob 122, and may include the opening $O_2$ through which at least one surface of the rotary knob 122 may be exposed to the outside. Although the opening $O_2$ may have a track shape, this is merely for illustrative purposes, and the scope of the present invention is not limited thereto.

Particularly, the circumferential surface of the housing 121 and the upper surface of the handle knob 112 may have the same curvature (or radius of curvature). The rotary knob 122 may be disposed with at least one end thereof exposed to the outside through the opening $O_2$ in the housing 121. Consequently, the rotary knob 122 may be rotated by a user through the opening $O_2$.

Figure 4:
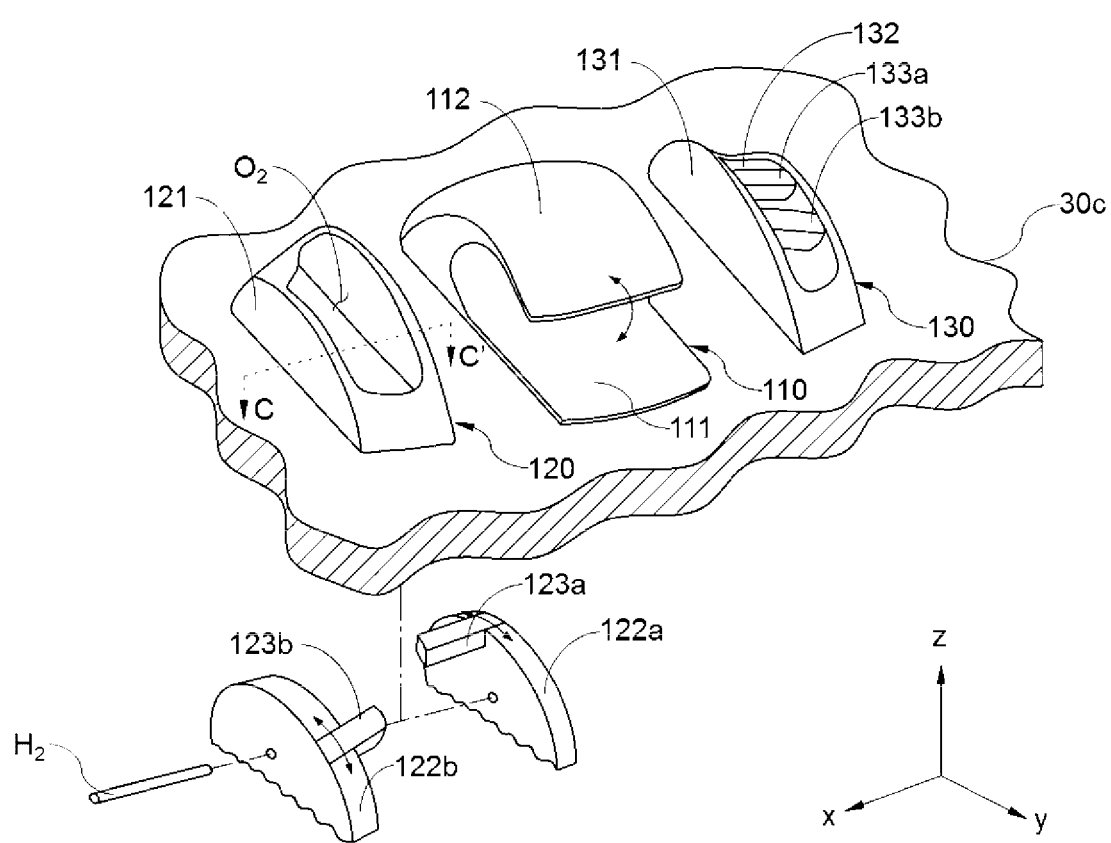
FIG. 4 is an exploded perspective view of the multifunctional switch manipulator shown in FIG. 3, which is partially broken away according to an exemplary embodiment of the present invention is applied.

The rotary knob 122 may be rotated along the inner circumferential surface of the housing 121 about a rotational shaft $H_2$ (see FIG. 4). A user may rotate the rotary knob 122 in one direction (e.g., in a counterclockwise direction) and/or in the opposite direction (e.g., in a counterclockwise direction) to raise and/or lower the window glass 40. In particular, the height of the window glass 40 during vertical movement of the window glass 40 may correspond to the rotational displacement of the rotary knob 121. At least one surface of the rotary knob 122, which is exposed to the outside through the opening $O_2$, may include grippers 123.

Particularly, the grippers 123 may be variously configured so long as the grippers 123 prevent slippage of a user's finger during manipulation by a user. In one exemplary embodiment, the grippers 123 may be configured to have protruding shapes (see B in FIG. 3). In another exemplary embodiment, the grippers 123 may have a corrugated pattern structure having high frictional force (see B' in FIG. 3). In particular, the number of rotary knobs 122 and 132 and/or grippers 123 and 133 provided at the driver's armrest 30 may be equal to the number of doors 10 provided on the vehicle. Each of the rotary knobs 122 and 123 may include a plurality of rotary knobs, and each of the grippers 123 and 133 may include a plurality of grippers.

When the vehicle has four doors, the grippers 123 and 133, disposed at the driver's armrest 30, may be arranged in two rows, and may be coupled to corresponding housings 121 and 131 to allow the window glasses 40, disposed at the driver's seat, the front passenger seat and the rear seats, to be individually manipulated by a user.

This will now be described with reference to FIGS. 4 and 5. Particularly, FIG. 4 is an exploded perspective view of the multifunctional switch manipulator 100 shown in FIG. 3, which is partially broken away and FIG. 5 is a plan view taken along line C-C' in FIG. 4.

Figure 5:
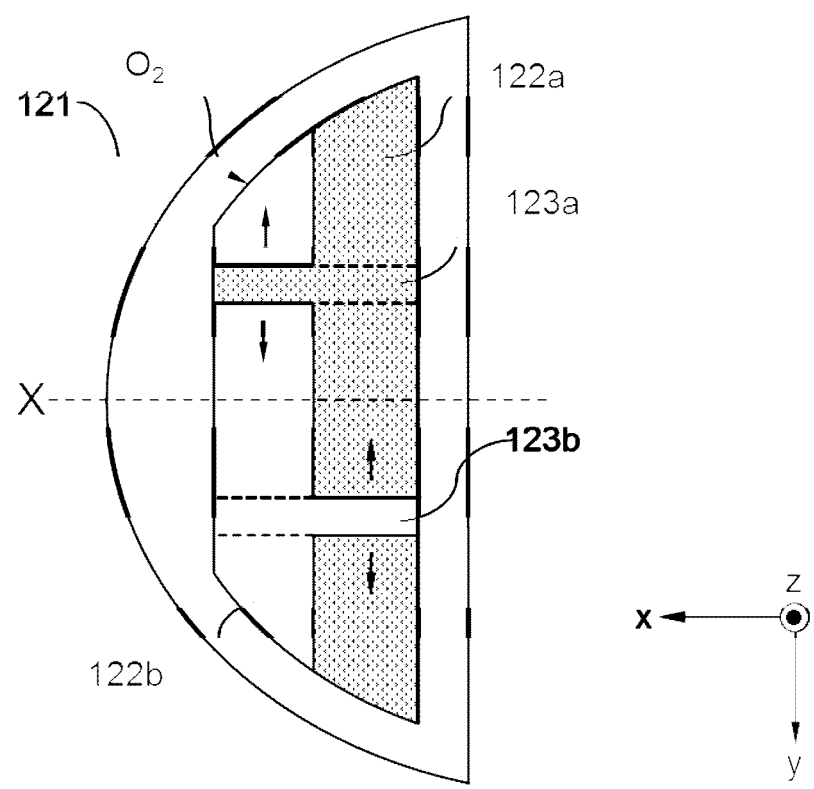
FIG. 5 is a plan view taken along line C-C' in FIG. 4 according to an exemplary embodiment of the present invention is applied.

Referring to FIGS. 4 and 5, each of the housings 121 and 131 of the second and third switch units 120 and 130 may include a plurality of rotary knobs 122 or 132 and a plurality of grippers 123 or 133, and the plurality of rotary knobs 122 and 132 may include a first rotary knob 122a and 132a that corresponds to a driver's seat or a front passenger seat and second rotary knobs 122b and 132b that corresponds to a rear seat. As mentioned above, since the elements of the second and third switch units 120 and 130 are substantially the same as each other, the second and third switch units 120 and 130 will now be described based on the second switch unit 120.

The first and second rotary knobs 122a and 122b may be rotatable about the same rotational shaft $H_2$, and may be configured to have an approximately semicircular shape. However, the scope of the present invention is not limited thereto. For example, it will be apparent to those skilled in the art that the shape of each of the first and second rotary knobs 122a and 122b may be modified into various shapes based on the overall shape of the multifunctional switch manipulator 100.

The first and second rotary knobs 122a and 122b may be spaced apart from each other in the direction of the central axis X of the multifunctional switch manipulator 100 to be manipulated independently of each other. Accordingly, when the first or second rotary knob 122a or 122b is rotated in one direction (e.g., a first direction) or in the opposite direction (e.g., a second direction), the second or first rotary knob 122b or 122a, which is coupled to face the rotary knob 122a or 122b, is not rotated and is held independently.

The plurality of grippers 123 may include a first gripper 123a, disposed at one surface of the first rotary knob 122a and projects in a direction (e.g., in the x-axis direction) toward the second rotary knob 122b, and a second gripper 123b, disposed at one surface of the second rotary knob 122b and projects in a direction (e.g., in the x-axis direction) toward the first rotary knob 122a. The lengths of the first and second grippers 123a and 123b may be the same as each other.

The first and second grippers 123a and 123b may be spaced apart from each other in the direction (in the y-axis direction) in which the opening $O_2$ extends. The first and second grippers 123a and 123b may be disposed at an upper or lower side of the opening $O_2$ in the neutral state, and the manipulatable rotational range thereof may be limited. In particular, the neutral state refers to a state in which each of the window glasses 40 is completely closed.

The first gripper 123a may be positioned at an upper side with respect to the central axis X of the multifunctional switch manipulator 100, and may have a width that corresponds to the width of the opening $O_2$. The rotation of the first gripper 123a may be limited within a range between the upper end of the opening $O_2$ and the central axis X.

The second gripper 123b may be positioned at a lower side with respect to the central axis X of the multifunctional switch manipulator 100, and may have a width that corresponds to the width of the opening $O_2$. The rotation of the second gripper 123b may be limited within a range between the central axis X and the lower end of the opening $O_2$.

The first and second rotary knobs 132a and 132b and the first and second grippers 133a and 133b, which are received in the housing 131 of the third switch unit 130, may have the same structures as the first and second rotary knobs 122a and 122b and the first and second grippers 123a and 123b, which are received in the housing 121 of the second switch unit 120. Accordingly, the plurality of grippers 123 and 133, which are provided in the multifunctional switch manipulator 100, may be arranged in two rows.

Hereinafter, the internal structure of the first switch unit 110 will be described with reference to FIG. 6. FIG. 6 is a cross-sectional view showing the internal structure of the first switch unit 110 according to an exemplary embodiment of the present invention.

Referring to FIG. 6, the first switch unit 110 may include the bracket 111, the handle knob 112 rotatably coupled at one end thereof to the bracket 111 via the hinge pin $H_1$, the rod 114, which is integrally connected at a first end thereof to the handle knob 112 to release the door latch 113, and the return spring (not shown), which is compressed by manipulation of the handle knob 112 and which may provide elastic force to the handle knob 112 to return the handle knob 112 to the initial position upon releasing the handle knob 112.

In particular, the hinge pin $H_1$ of the first switch unit 110 may be parallel to the central axis X of the multifunctional switch manipulator 100, and may be different from the rotational shaft $H_2$ of the second and third switch units 120 and 130. In other words, the hinge pin $H_1$ and the rotational shaft $H_2$ are not positioned on the same axis on the y-z plane.

The bracket 111 may have a semicircular section, and functions to support the handle knob 112 by means of the hinge pin $H_1$. The opening $O_1$, having a predetermined size, may be formed between the bracket 111 and the handle knob 112 to receive a user's finger therein. A user may open the door 10 by directly pulling the handle knob 112 in the z-axis direction.

When the user rotates the handle knob 112, for example, in a counterclockwise direction, the rod 114 connected to the handle knob 112 may be pulled, and the locked state of the door latch 113 may thus be released, thereby opening the door 10. In particular, the return spring (not shown), disposed around the rod 114, may store elastic energy in the compressed state. When the door 10 is opened by the user, the handle knob 112 may be rotated in a clockwise direction by the elastic force of the return spring (not shown), and may be returned to the initial position thereof.

Figure 8:
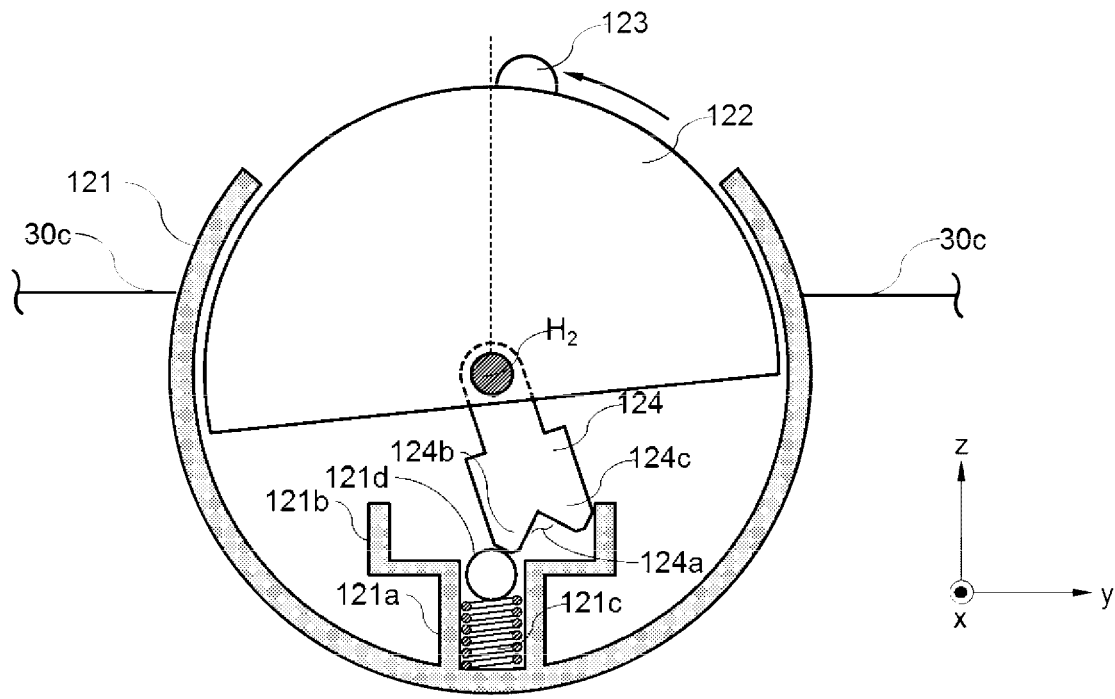
FIG. 8 is a cross-sectional view of the second switch unit shown in FIG. 7 in which the gripper is raised according to an exemplary embodiment of the present invention is applied.
Figure 9:
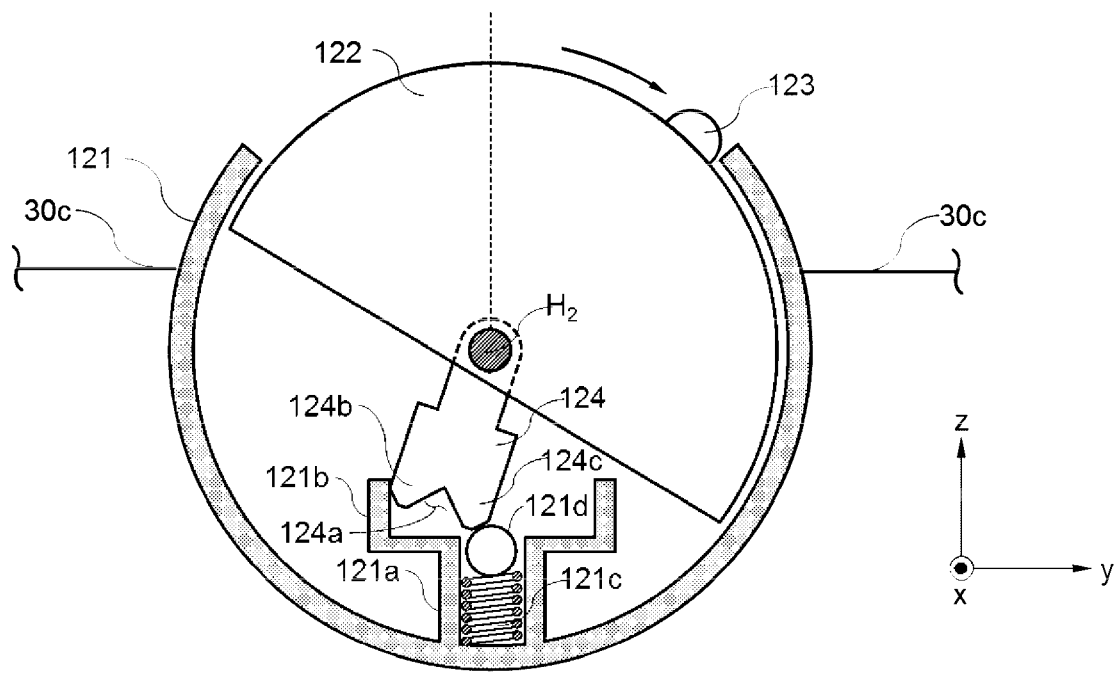
FIG. 9 is a cross-sectional view of the second switch unit shown in FIG. 7 in which the gripper is lowered according to an exemplary embodiment of the present invention is applied.

Hereinafter, the internal structure of the second switch unit 120 will be described with reference to FIGS. 7 to 9. FIG. 7 is a cross-sectional view of the second switch unit according to an exemplary embodiment of the present invention in the neutral state. FIG. 8 is a cross-sectional view of the second switch unit shown in FIG. 7 in which the gripper is raised. FIG. 9 is a cross-sectional view of the second switch unit shown in FIG. 7 in which the gripper is lowered.

Referring to FIG. 7, the housing 121 may include therein a reception aperture 121a, a stopper 121b configured to limit the rotational angle of the rotary knob 122 to cause the rotary knob 122 to be rotated only within a predetermined rotational range, and an elastic member 121c and a metal ball 121d, received in the reception aperture 121a to exert elastic force on a push member 124. A push member 124, having a notch shape, may be coupled to the lower side of the rotary knob 122. In the neutral state, the push member 124 may be brought into close contact with the metal ball 121d, thereby locking the rotary knob 122.

More specifically, the metal ball 121d may be received at at least a portion thereof in the reception aperture 121a in the housing 121 to be in close contact with the push member 124 and to restrict the movement of the push member 124. The elastic member 121c may elastically support the metal ball 121d and may apply elastic force to the push member 124, with the result that the metal ball 121d may be maintained stably in close contact with the push member 124. Although the elastic member 121c is shown in the drawings as having a coil spring that contacts the metal ball 121d, the elastic member 121c may be modified to have any of various structures capable of elastically supporting the metal ball 121d.

Referring to FIG. 8, when the gripper 123 is manipulated by a user in one direction (e.g., in a counterclockwise direction), both the rotary knob 122 and the push member 124 may be inclined in one direction, and thus the metal ball 121d may be disengaged from a notch 124a in the push member 124 and may be brought into close contact with a first projection 124b. At this time, the push member 124 may be engaged with the metal ball 121d, and the rotary member 122 may be locked in the inclined state to activate the contact circuit (not shown). Particularly, the rotary knob 122 may be rotated until a second projection 124c of the push member 124 comes into contact with the stopper 121b. Accordingly, the width of the stopper 121b may be designed to correspond to the maximum rotational angle of the rotary knob 122.

Referring to FIG. 9, when the gripper 123 is manipulated by the user in the opposite direction (e.g., in a clockwise direction), both the rotary knob 122 and the push member 124 may be inclined in the opposite direction, and thus the metal ball 121d may be disengaged from the notch 124a in the push member 124 and brought into close contact with the second projection 124c. At this time, the push member 124 may be engaged with the metal ball 121d, and the rotary member 122 may be locked in the inclined state to activate the contact circuit (not shown). In particular, the rotary knob 122 may be rotated until a first projection 124b of the push member 124 comes into contact with the stopper 121b. Accordingly, the width of the stopper 121b may be designed to correspond to the maximum rotational angle of the rotary knob 122.

Figure 10:
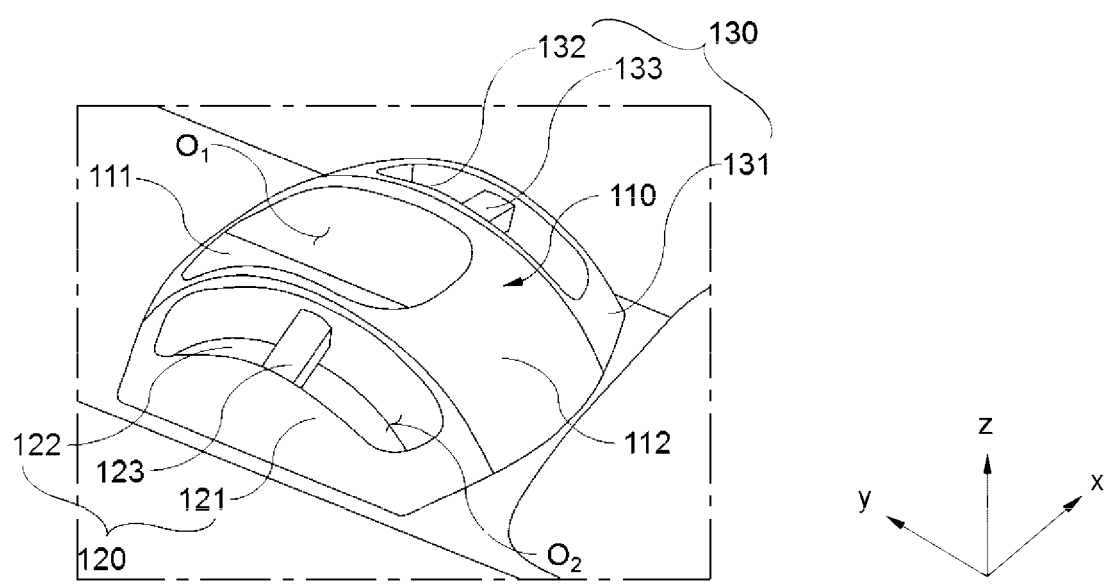
FIG. 10 is an enlarged perspective view of a multifunctional switch manipulator according to another exemplary embodiment of the present invention, which is provided at a front passenger seat armrest and/or a rear seat armrest.

FIG. 10 is an enlarged perspective view of a multifunctional switch manipulator 100 according to another exemplary of the present invention, which is disposed at a front passenger seat armrest and/or a rear seat armrest 3. Referring to FIG. 10, the multifunctional switch manipulator 100 according to another exemplary embodiment of the present invention may include a first switching unit 110 configured to open and close the door 10 of the vehicle, and second switching units 120, coupled to the two ends of the first switching unit 110 to raise and lower the window glass 40.

Unlike the multifunctional switch manipulator shown in FIG. 3, the second switching unit 120 shown in FIG. 10 may include the rotary knob 122 and the gripper 123 arranged in a row and coupled to each of the housings 121. Since the functions, structures and the like of the remaining components other than the rotary knob 122 and the gripper 123 are identical to those shown in FIGS. 3 to 9, a detailed description thereof is omitted.

According to the exemplary embodiments of the present invention, since various switch devices, which enable multiple operations, are integrated into a single assembly, it may be possible to downsize an armrest and to improve the efficiency of the manipulator. Furthermore, since a larger space in a vehicle may be secured, an operating efficiency may also be improved. In addition, since the manipulator may be gripped more easily by a user, freedom in design may be ensured, and perceived quality and convenience may be improved.

The effects that may be obtained by the embodiments are not limited to the above-mentioned effects, and other effects will be apparent to those skilled in the art to which the present belongs from the present disclosure.

It will be apparent to those skilled in the art that various modifications and variations may be made in the present invention without departing from the spirit or scope of the invention. Thus, it is intended that the present invention covers the modifications and variations of this invention provided they come within the scope of the appended claims and their equivalents.

What is claimed is:

1. A multifunctional switch manipulator, comprising:
a first switch unit curved to be convex at the upper surface thereof;
a second switch unit disposed at a first side of the first switch unit and extending radially in a first direction; and
a third switch unit disposed at a second side of the first switch unit and extending radially in a second direction opposite the first direction,
wherein each of the second and third switch units includes:
a housing having an opening; and
a rotary knob disposed at the housing to be rotatable in a direction in which the opening extends,
wherein at least one surface of the rotary knob is exposed to an outside through the opening,
wherein the second and third switch units are coupled to each other to face each other with the first switch unit interposed therebetween, and
wherein the multifunctional switch manipulator has a semispherical shape, the two ends of which are cut into dome shapes.

2. The multifunctional switch manipulator according to claim 1, wherein an upper surface of the first switch unit and the housings of the second and third switch units have the same radius of curvature.

3. The multifunctional switch manipulator according to claim 1, wherein the first to third switch units are arranged along a first axis to be parallel to one another.

4. The multifunctional switch manipulator according to claim 1, wherein the opening has a track shape.

5. The multifunctional switch manipulator according to claim 3, wherein each of the second and third switch units includes a gripper disposed on at least one surface of the rotary knob.

6. The multifunctional switch manipulator according to claim 5, wherein the rotary knob includes a first rotary knob and a second rotary knob, which are received in the housing, and wherein the first and second rotary knobs are coupled to each other to be rotatable about a second axis parallel to the first axis.

7. The multifunctional switch manipulator according to claim 6, wherein the first and second rotary knobs are spaced apart from each other in a direction of the first axis.

8. The multifunctional switch manipulator according to claim 6, wherein the gripper includes:
   a first gripper disposed on one surface of the first rotary knob and projecting toward the second rotary knob; and
   a second gripper disposed on one surface of the second rotary knob and projecting toward the first rotary knob.

9. The multifunctional switch manipulator according to claim 8, wherein lengths of the first and second grippers are the same.

10. The multifunctional switch manipulator according to claim 8, wherein the first and second grippers are spaced apart from each other in a direction in which the opening extends.

11. The multifunctional switch manipulator according to claim 1, wherein the rotary knob is rotatable within a predetermined rotational range by a stopper provided inside the housing.

12. The multifunctional switch manipulator according to claim 3, wherein the first switch unit includes:
   a bracket; and
   a handle knob coupled at one end thereof to the bracket via a third axis to be rotatable about the third axis.

13. The multifunctional switch manipulator according to claim 12, wherein the third axis is parallel to the first axis, and is different from the second axis.

14. The multifunctional switch manipulator according to claim 12, wherein, when the handle knob is rotated in one direction, a rod connected to the handle knob is pulled to release a locked state of a door latch, thereby allowing a door of the vehicle to be opened.

15. The multifunctional switch manipulator according to claim 1, wherein, when the rotary knob is rotated in one direction, a window glass of the vehicle is raised or lowered by a height corresponding to a rotational displacement of the rotary knob.

16. The multifunctional switch manipulator according to claim 1, wherein the first to third switch units are partially received and disposed in a reception groove in a panel part.

17. The multifunctional switch manipulator according to claim 1, wherein the rotary knob is provided on at least one surface thereof with a corrugated pattern.

* * * * *